(12) United States Patent
Kennedy, III et al.

(10) Patent No.: US 6,350,793 B1
(45) Date of Patent: Feb. 26, 2002

(54) METHOD OF IMPROVING SCUFF AND CUT RESISTANCE OF IONOMER COVERED GOLF BALL

(75) Inventors: Thomas J. Kennedy, III, Wilbraham; Mark L. Binette, Ludlow; R. Dennis Nesbitt, Westfield, all of MA (US); Michael J. Sullivan, Old Lyme, CT (US)

(73) Assignee: Spalding Sports Worldwide, Inc., Chicopee, MA (US)

( * ) Notice: Subject to any disclaimer, the term of this patent is extended or adjusted under 35 U.S.C. 154(b) by 0 days.

(21) Appl. No.: 09/490,184

(22) Filed: Jan. 22, 2000

Related U.S. Application Data

(63) Continuation-in-part of application No. 09/283,767, filed on Apr. 1, 1999, now Pat. No. 6,274,679, which is a continuation of application No. 08/942,653, filed on Oct. 2, 1997, now Pat. No. 5,891,973, which is a continuation of application No. 08/595,898, filed on Feb. 6, 1996, now abandoned, application No. 09/490,184, which is a continuation-in-part of application No. 09/235,252, filed on Jan. 22, 1999.

(60) Provisional application No. 60/116,846, filed on Jan. 22, 1999, provisional application No. 60/116,870, filed on Jan. 22, 1999, provisional application No. 60/116,900, filed on Jan. 22, 1999, and provisional application No. 60/116,899, filed on Jan. 22, 1999.

(51) Int. Cl.$^7$ .......................... A63B 37/06; A63B 37/12; C08L 9/00

(52) U.S. Cl. .................. 522/153; 525/193; 525/236; 473/371; 473/372; 473/373; 473/374

(58) Field of Search ................................ 525/193, 236; 473/371, 372, 373, 374; 522/153

(56) References Cited

U.S. PATENT DOCUMENTS

| | | |
|---|---|---|
| 4,431,193 A | 2/1984 | Nesbitt |
| 4,679,795 A | 7/1987 | Melvin et al. |
| 4,683,257 A * | 7/1987 | Kakiuchi |
| 4,838,556 A | 6/1989 | Sullivan |
| 4,844,471 A | 7/1989 | Terence et al. |
| 4,852,884 A | 8/1989 | Sullivan |
| 4,884,814 A | 12/1989 | Sullivan |
| 4,911,451 A | 3/1990 | Sullivan et al. |
| 5,816,943 A | 10/1998 | Masutani et al. |
| 5,857,925 A | 1/1999 | Sullivan et al. |

FOREIGN PATENT DOCUMENTS

GB 2309971 * 8/1997

OTHER PUBLICATIONS

*Golf Tips Magazine*, Oct. 2000, p. 14.

* cited by examiner

Primary Examiner—David J. Buttner

(57) ABSTRACT

Disclosed herein is a game ball and method for making the same. The game ball has an ionomeric cover which includes a combination of ionomeric crosslinks and covalent crosslinks. The game ball cover is superior in at least one of cut resistance and scuff resistance to a conventional cover that does not have covalent crosslinks but is otherwise substantially identical in composition. The game ball cover of the invention is particularly useful for improving the durability of golf balls to be struck with sharp-grooved clubs.

24 Claims, 1 Drawing Sheet

METHOD OF IMPROVING SCUFF AND CUT RESISTANCE OF IONOMER COVERED GOLF BALL

CONTINUING DATA

This application claims the benefit of the filing date of U.S. Provisional Applications: Ser. No. 60/116,846, filed Jan. 22, 1999; Ser. No. 60/116,900, filed Jan. 22, 1999; Ser. No. 60/116,899, filed Jan. 22, 1999; and Ser. No. 60/116,870, filed Jan. 22, 1999. In addition, this application is a continuation-in-part of U.S. application Ser. No. 09/283,767, filed Apr. 1, 1999 now U.S. Pat. No. 6,274,679, which is a continuation of U.S. application Ser. No. 08/942,653, filed Oct. 2, 1997 (now U.S. Pat. No. 5,891,973), which is a continuation of U.S. application Ser. No. 08/595,898, filed Feb. 6, 1996 (abandoned). This application also a C-I-P of application Ser. No. 09/235,252, filed Jan. 22, 1999.

BACKGROUND OF THE INVENTION

This invention relates generally to game balls, and more particularly to a game ball, such as a golf ball, having an ionomeric cover.

Before the development of ionomers, balata was the preferred material for golf ball covers. Polyethylene also was proposed for use as a golf ball cover material but was generally deemed highly inferior to balata in imparting playability and durability characteristics to the ball due to its brittleness and high hardness, and thus never became a commercially successful golf ball cover material.

Balata golf ball covers have now been replaced to a great extent by ionomeric cover materials. As a result of their toughness, durability, and flight characteristics, various ionomeric resins sold by E. I. DuPont deNemours & Company (see U.S. Pat. No. 4,884,814) under the trademark Surlyn® and more recently, by the Exxon Corporation (see U.S. Pat. No. 4,911,451) under the trademarks Escor® and the tradename "Iotek", have become the materials of choice for the construction of golf ball covers over the traditional "balata" (trans polyisoprene, natural or synthetic) rubbers. The softer balata covers, although exhibiting enhanced playability properties, lack the overall durability necessary for repetitive play.

Ionomeric resins are generally ionic copolymers or terpolymers of an olefin such as ethylene and a metal salt of an unsaturated carboxylic acid, such as acrylic acid, methacrylic acid, or maleic acid. Optionally, an acrylate can also be present. Metal ions, such as sodium or zinc, are used to neutralize some portion of the acidic groups in the copolymer resulting in a thermoplastic elastomer exhibiting enhanced properties, i.e. improved durability, etc., for golf ball cover construction over balata.

In this regard, the metal ions serve as crosslinking agents, as they are ionically bonded to carboxylic acid groups in adjacent copolymer chains. However, instead of having thermally irreversible covalent bonding, ionomers have thermolabile crosslinking in which metal ions become part of the chemical structure of the ionomer upon crosslinking, and these crosslinks are reversible. Consequently, at high temperatures ionomers are subject to distortion or degradation.

Furthermore, the advantages gained through the use of ionomer resins in golf ball cover formulations in increased durability have been offset to some degree by the decreases produced in playability. This is because although the ionomeric resins are very durable, they tend to be very hard when utilized for golf ball cover construction, and thus lack the degree of softness required to impart the spin necessary to control the ball in flight.

As a result, while there are currently more than fifty commercial grades of ionomers available from DuPont and Exxon with a wide range of properties which vary according to the type and amount of metal cations, molecular weight, composition of the base resin (i.e. relative content of ethylene and methacrylic and/or acrylic acid groups) and additive ingredients such as reinforcements, etc., a great deal of research continues in order to develop golf ball cover compositions exhibiting not only the improved impact resistance and carrying distance properties produced by the "hard" ionomeric resins, but also the playability (i.e. "spin") characteristics previously associated with the "soft" balata covers, properties which are still desired by the more skilled golfer.

In various attempts to produce such an ideal golf ball, the golfing industry has blended the hard ionomeric resins with a number of softer polymeric materials, such as softer polyurethanes. However, the blends of the hard ionomer resins with the softer polymeric materials have generally been dissatisfactory in that these balls exhibit numerous processing problems. In addition, the balls produced by such a combination are usually short on distance.

In addition, various "hard-soft ionomeric blends", i.e. mixtures of ionomer resins which are significantly different in hardness and/or flexural modulus, have been attempted. However, until the development of the specific blend combination set forth in U.S. Pat. No. 4,884,814, directed to low modulus golf ball cover compositions, these balls were not particularly commercially viable. In this regard, although the balls produced using the hard-soft ionomer blends exhibited enhanced playability characteristics, they lacked the durability needed for continuous play.

Moreover, while there are numerous advantages to the use of ionomers in making golf ball covers, one drawback of conventional golf balls with ionomeric covers are that the covers are prone to softening at temperatures of approximately 50° C. or above. As a result, the ionomeric covers (and in particular, soft ionomeric covers) may lose their dimple pattern or develop flat spots if exposed to high temperatures.

Accordingly, it would be useful to develop a golf ball with an ionomeric cover which is highly resistant to high temperature distortion or degradation without sacrificing the properties of distance, durability and/or playability.

Furthermore, it would be useful to improve the heat resistance of soft ionomeric golf ball covers without substantially hardening the covers. This would result in the production of a soft ionomer covered golf ball having the distance, durability and/or playability characteristics desired while also being resistant to degradation at high temperatures.

There are numerous advantages to use of ionomers in making golf ball covers. On the other hand, one drawback of conventional golf balls with soft ionomeric covers are that the covers are prone to scuffing and cutting, particularly when hit with irons which have sharp grooves. It would be useful to develop a golf ball with a soft ionomeric cover which is highly resistant to cutting and scuffing by sharp-grooved clubs.

SUMMARY OF THE INVENTION

An object of the invention is to provide an ionomeric game ball cover having improved scuff resistance and/or cut resistance.

Another object of the invention is to provide a method for imparting improved scuff resistance and/or cut resistance to a game ball cover.

Yet another object of the invention is to provide a golf ball with a soft cover which is well-suited for use with golf club irons having sharp grooves.

Yet another object of the invention is to provide a method of forming a golf ball with a soft cover which has excellent scuff resistance and/or cut resistance.

Another object of the invention is to provide a method for improving the heat and/or melt resistance of a golf ball cover. The invention is directed to any type of ionomer covered golf ball including unitary, wound, two-piece, three-piece and multi-layered golf balls.

Yet another object of the invention is to provide a golf ball with a soft ionomer cover which is well-suited for repetitive play and exhibits improved heat and/or melt resistance when subject to high temperatures, i.e. 50° C. or more.

Another object of the invention is to provide a golf ball with a very soft ionomeric cover having enhanced heat stability and/or improved heat and melt resistance. These golf balls also exhibit the feel and playability characteristics that highly-skilled golfers prefer. This enables the soft covered golf balls to exhibit enhanced dimple retention during prolonged exposure to high temperatures.

Other objects will be in part obvious and in part pointed out more in detail hereinafter.

The invention in a preferred form is a game ball having a cover comprising an ionomer resin. The ionomer resin includes a copolymer of an olefin and an $\alpha$, $\beta$-ethylenically unsaturated carboxylic acid which is about 10–100% neutralized with metal ions. The copolymer has a sufficient degree of covalent crosslinking to impart to the cover improved resistance to at least one of scuffing and cutting. In a particularly preferred form of the invention, the game ball is a golf ball. Preferably, the game ball has a dimpled surface. The covalent crosslinking preferably comprises irradiation-induced covalent crosslinking.

In a preferred form of the invention, the degree of covalent crosslinking is appropriate to impart to the cover a Shore D hardness which is no more than about 10% greater, and more preferably no more than about 5% greater, than the Shore D hardness of a cover having an identical composition but which does not include a substantial degree of covalent crosslinking. Preferably, the copolymer includes an acrylate.

Another preferred form of the invention is a method of treating a game ball. The method comprises the steps of obtaining a game ball having a cover comprising an ionomer, and irradiating the ionomer in the cover under conditions appropriate to covalently crosslink the ionomer in order to increase the resistance of the cover to at least one of scuffing and cutting with substantially impairing other playability characteristics of the ball. In a particularly preferred form of the invention, the game ball is a golf ball. Preferably, the game ball has a dimpled surface.

According to the preferred method of the invention, the game ball is subjected to electron beam treatment at a dosage of at least 2 megarads. The game ball cover preferably is irradiated prior to application of a top coat over a cover. The method of the invention preferably further includes the step of applying a top coat over the cover before or after irradiation.

More particularly, the outer cover is a blend of one or more ionomer copolymers and/or terpolymers and one or more ionomers having a high Vicat softening temperature. Preferably, the high Vicat softening temperature ionomer also has a high melt temperature. More preferably, the difference between the high melt temperature and the Vicat softening temperature of the high melt ionomer is minimized. It has been found that such high melt ionomers act as good heat stability modifiers for ionomer covers, and in particular, for soft ionomer covered golf balls.

Along these lines, the Vicat softening temperature of the high melt ionomer incorporated into the present invention is 74° C. or more, preferably 80° C. or more, and most preferably, 84° C. or more. The melt temperature of the high melt ionomer is 96° C. or more, preferably 98° C. or more, and most preferably, 100° C. or more. Furthermore, the high melt ionomer utilized in the invention exhibits a difference in melt temperature and Vicat temperature of 25° C., more preferably 19° C. or less, most preferably 17° C. or less.

Additionally, the high melt ionomer of the present invention can also be utilized to formulate that inner cover layer or mantle of a multi-layer golf ball. Accordingly, one or more of the ionomer layers of a multi-layer golf ball can exhibit high heat stability.

The dimpled cover golf ball of the present invention preferably has a Shore D hardness cover of 63 or less, preferably 55 or less, and most preferably 50 or less.

Additionally, the present invention is directed to a golf ball comprising a core in combination with the improved covers that includes a particular combination of polybutadiene rubbers, and a cover disposed about the core which includes a specific combination of ionomer resins. The polybutadiene rubbers used in the particular combination include a first polybutadiene rubber that is obtained utilizing a cobalt catalyst and which exhibits a Mooney viscosity in the range of from about 70 to about 83. The combination of polybutadiene rubbers also includes a second polybutadiene rubber that is obtained utilizing a neodymium series catalyst or a blend of neodymium catalyzed polybutadienes and which exhibits a Mooney viscosity of from about 30 to about 70.

The invention accordingly comprises the several steps and the relation of one or more of such steps with respect to each of the others and the article possessing the features, properties, and the relation of elements exemplified in the following detailed disclosure.

BRIEF DESCRIPTION OF THE DRAWINGS

The following is a brief description of the drawings which are presented for the purposes of illustrating the invention and not for the purposes of limiting the same.

DETAILED DESCRIPTION OF THE INVENTION

The game balls of the present invention are surprisingly superior in their scuff (abrasion) resistance and cut resistance to conventional game balls which have not been electron beam treated, and which contain similar quantities of ionomer and have a similar hardness. Furthermore, the golf balls and other game balls of the invention are comparable in scuff and cut resistance to game balls having non-ionomeric compositions, such as polyurethanes, with similar properties of compression, coefficient of restitution (COR) and hardness.

Furthermore, the golf balls of the present invention are surprisingly superior in their heat resistance to conventional golf balls which contain similar quantities of ionomer and have a similar hardnesses. In accordance with the invention, the golf balls of the invention are comparable in heat resistance to golf balls having non-ionomeric compositions, such as polyurethanes, with similar properties of compression, coefficient of restitution (C.O.R.) and hardness.

The game balls of the invention are formed by first obtaining and uncoated or coated game ball having an ionomeric cover. An "uncoated" game ball as the term is used in this application is a one, two, or multi-piece game ball to which no primer or top coat has been applied over the ionomeric cover. In contrast, a "coated" game ball as this term is used in this application is a ball which has a primer coat and/or a top coat over the ionomeric cover layer The coated or uncoated game ball of the invention is subjected to irradiation under conditions appropriate to induce covalent crosslinking of the ionomer. This type of direct covalent bonding has been found to take place in ionomeric cover materials when electron beam treatment is applied at a dosage of 2 or more megarads and is expected to also be useful at lower dosages, for example, 1 megarad.

For clarity of description and ease of understanding, the invention will be described in connection with golf balls although it will be understood that other game balls, including but not limited to softballs, basketballs, baseballs, soccer balls, volleyballs, street hockey balls, footballs, and the like, can advantageously employ the features of the present invention.

Figure 1:
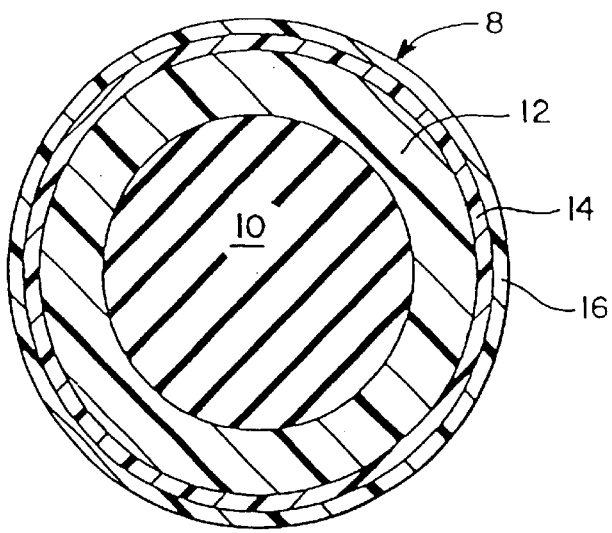
FIG. 1. shows a golf ball according to the present invention.

Referring now to the drawings, and in particular to FIG. 1, a golf ball according to the present invention is shown and is designated as 8. The ball has a core 10, which is solid, or is formed from any other suitable type of core composition. An ionomeric inner cover layer 12 surrounds the core 10. An outer cover layer 14 surrounds the inner cover layer 12. A top coat and/or primer coat 16 surrounds the outer cover layer 14. The thicknesses of top coat/primer coat 14 and top coat 16 are exaggerated for illustrative purposes.

In accordance with the present invention, after the inner cover layer 12 is applied over the core. The outer cover layer 14 is then applied over the inner cover layer. The outer cover layer 14 is subjected to irradiation at a dose of about 1 or more megarads in order to covalently crosslink the ionomeric cover material. Particularly good results are obtained when the dosage is 2–12 megarads. In a most preferred form of the invention, a dosage of 4–8 megarads is utilized. As used herein, the term "irradiation" refers to short-duration irradiation using an electron beam or the like, rather than to mere exposure to sunlight, which would result in a dosage of well below 1 megarad. Irradiation takes place at a temperature below the melting or deformation temperature of the cover layer, and for convenience preferably takes place at ambient temperature.

The cover 14 can be irradiated prior to or after application of primer coat and/or top coat 16. Furthermore, the primer coat can be eliminated if adhesion of top coat 16 to cover 14 is sufficient to render the ball suitable for competitive play, as is commonly the case with softballs and baseballs, and may also be the case for other game balls.

The game ball of the invention can be irradiated with electrons, neutrons, protons, gamma rays, x-rays, helium nuclei, or the like. In a particularly preferred form of the invention, the scuff and cut resistance of cover 14 is enhanced by subjecting the cover to electron beam treatment at a dosage sufficient to significantly improve scuff resistance and COR without excessively hardening the compression. The game ball preferably obtains an improvement in COR of at least 0.5% as a result of irradiation of the cover.

Cores

The golf ball core compositions of the present invention comprise one or more rubber or elastomeric components and an array of non-rubber or non-elastomeric components. The rubber components of the core compositions of the invention comprise a particular polybutadiene synthesized with cobalt and having an ultra-high Mooney viscosity and certain molecular weight characteristics described in detail below, one or more particular polybutadienes synthesized with neodymium, and one or more other optional polybutadienes. In some applications, polybutadienes synthesized with nickel catalysts may be used in combination with or instead of polybutadienes synthesized with cobalt catalysts. And, polybutadienes synthesized with lanthanide series catalysts may be used in combination with or instead of polybutadienes synthesized with neodymium catalysts. The non-rubber components of the core compositions of the invention comprise one or more crosslinking agents which preferably include an unsaturated carboxylic acid component, a free radical initiator to promote cross linking, one or more optional modifying agents, fillers, moldability additives, processing additives, and dispersing agents, all of which are described in greater detail below.

The first preferred polybutadiene resin for use in the present invention composition has a relatively ultra high Mooney viscosity. A "Mooney unit" is an arbitrary unit used to measure the plasticity of raw, or unvulcanized rubber. The plasticity in Mooney units is equal to the torque, measured on an arbitrary scale, on a disk in a vessel that contains rubber at a temperature of 212° F. (100° C.) and that rotates at two revolutions per minute.

The measurement of Mooney viscosity, i.e. Mooney viscosity [$ML_{1+4}$(100° C.)], is defined according to the standard ASTM D-1646, herein incorporated by reference. In ASTM D-1646, it is stated that the Mooney viscosity is not a true viscosity, but a measure of shearing torque over a range of shearing stresses. Measurement of Mooney viscosity is also described in the *Vanderbilt Rubber Handbook,* 13th Ed., (1990), pages 565–566, also herein incorporated by reference. Generally, polybutadiene rubbers have Mooney viscosities, measured at 212° F., of from about 25 to about 65. Instruments for measuring Mooney viscosities are commercially available such as a Monsanto Mooney Viscometer, Model MV 2000. Another commercially available device is a Mooney viscometer made by Shimadzu Seisakusho Ltd.

The first particular polybutadiene for use in the preferred embodiment compositions preferably contains a majority fraction of polymer chains containing a cis-1,4 bond, more preferably, having a cis-1,4 polybutadiene content of about 90%, and most preferably, having a cis-1,4 polybutadiene content of at least about 95%. Another characteristic of the first preferred polybutadiene is that it is obtained or synthesized by utilizing a cobalt or cobalt-based catalyst. As noted herein, in some applications, a polybutadiene synthesized by using a nickel catalyst may be employed with, or in place of, the polybutadiene synthesized with a cobalt catalyst.

A commercially available polybutadiene corresponding to the noted first preferred ultra high viscosity polybutadiene, and which is suitable for use in the preferred embodiment compositions in accordance with the present invention is available under the designation Cariflex BCP 820, from Shell Chimie of France. Although this polybutadiene produces cores exhibiting higher C.O.R. values, it is somewhat difficult to process using conventional equipment. The properties and characteristics of this preferred polybutadiene are set forth below in Table 1.

TABLE 1

Properties of Shell Chimie BCP 820 (Also Known As BR-1220X)

| Property | Value | |
| --- | --- | --- |
| Mooney Viscosity (approximate) | 70–83 | |
| Volatiles Content | 0.5% maximum | |
| Ash Content | 0.1% maximum | |
| Cis 1,4-polybutadiene Content | 95.0% minimum | |
| Stabilizer Content | 0.2 to 0.3% | |
| Polydispersity | 2.4–3.1 | |
| Molecular Weight Data: | Trial 1 | Trial 2 |
| $M_n$ | 110,000 | 111,000 |
| $M_w$ | 300,000 | 304,000 |
| $M_z$ | 680,000 | |
| $M_{peak}$ | 175,000 | |

The second polybutadiene for use in the preferred embodiment golf ball core compositions is a polybutadiene that is obtained or synthesized by utilizing a neodymium or lanthanide series catalyst, and that exhibits a Mooney viscosity of from about 30 to about 70, preferably from about 35 to about 70, more preferably from about 40 to about 65, and most preferably from about 45 to about 60. While the second polybutadiene provides covers exhibiting higher C.O.R. values, it exhibits very poor cold flow properties and very high dry swell characteristics.

Examples of such second polybutadienes obtained by using a neodymium-based catalyst include Neo Cis 40, Neo Cis 60 from Enichem. The properties of these polybutadienes are given below.

TABLE 2

Properties of Neo Cis

| Properties of Raw Polymer Microstructure | |
| --- | --- |
| 1,4 cis (typical) | 97.5% |
| 1,4 trans (typical) | 1.7% |
| Vinyl (typical) | 0.8% |
| Volatile Matter (max) | 0.75% |
| Ash (max) | 0.30% |
| Stabilizer (typical) | 0.50% |
| Mooney Viscosity, ML 1 + 4 at 100° C. | 38–48 and 60–66 |
| Properties of compound (typical) Vulcanization at 145° C. | |
| Tensile strength, 35' cure, | 16 MPa |
| Elongation, 35' cure, | 440% |
| 300% modulus, 35' cure, | 9.5 MPa |

It has been found that when the first and second polybutadienes are blended together within certain ranges, golf ball cores can be produced without the individual processing difficulties associated with each polybutadiene. In essence, a synergistic effect is produced allowing the blends to produce golf ball cores using conventional equipment exhibiting enhanced resilience.

Concerning the elastomeric or rubber portion of the preferred embodiment compositions, it is preferred to utilize the previously described first and second polybutadienes in particular proportions to one another. Generally, it is preferred to utilize the first polybutadiene in a proportion of less than 50 parts per hundred parts of the total amount of the first and second polybutadienes. Unless indicated otherwise, all parts expressed herein are parts by weight. More preferably, the first polybutadiene is utilized in a proportion of about 45 parts or less (most preferably 40 parts or less) per hundred parts of the total amount of the first and second polybutadienes. With respect to the second polybutadiene, it is generally preferred to utilize the second polybutadiene in a proportion of more than 50 parts per hundred parts of the total amount of the first and second polybutadienes. More preferably, the second polybutadiene is utilized in a proportion of about 55 parts or more (most preferably 60 parts or more) per hundred parts of the total amount of the first and second polybutadienes.

The preferred embodiment core compositions of the present invention generally comprise from about 80 parts to about 120 parts by weight of elastomeric or rubber components, i.e. the first and second polybutadienes, and from about 60 to about 80, or more, parts by weight of non-rubber or non-elastomeric components. Preferably, the core compositions comprise about 100 parts of rubber components and from about 60 to about 80, or more, parts by weight of non-rubber components. It will be understood that depending upon the types and respective function of components added to the non-rubber portion of the preferred embodiment core compositions, that the non-rubber portion may constitute a significant proportion of the rubber component. The rubber components include the previously described first and second polybutadienes. The non-rubber components are as follows.

Preferably, the crosslinking agent of the core composition is an unsaturated carboxylic acid component which is the reaction product of a carboxylic acid or acids and an oxide or carbonate of a metal such as zinc, magnesium, barium, calcium, lithium, sodium, potassium, cadmium, lead, tin, and the like. Preferably, the oxides of polyvalent metals such as zinc, magnesium and cadmium are used, and most preferably, the oxide is zinc oxide.

Exemplary of the unsaturated carboxylic acids which find utility in the preferred core compositions are acrylic acid, methacrylic acid, itaconic acid, crotonic acid, sorbic acid, and the like, and mixtures thereof. Preferably, the acid component is either acrylic or methacrylic acid. Usually, from about 15 to about 50, and preferably from about 20 to about 35 parts by weight of the carboxylic acid salt, such as zinc diacrylate, is included per 100 parts of the rubber components in the core composition. The unsaturated carboxylic acids and metal salts thereof are generally soluble in the elastomeric base, or are readily dispersible.

The free radical initiator included in the core composition is any known polymerization initiator (a co-crosslinking agent) which decomposes during the cure cycle. The term "free radical initiator" as used herein refers to a chemical which, when added to a mixture of the elastomeric blend and a metal salt of an unsaturated, carboxylic acid, promotes crosslinking of the elastomers by the metal salt of the unsaturated carboxylic acid. The amount of the selected initiator present is dictated only by the requirements of catalytic activity as a polymerization initiator. Suitable initiators include peroxides, persulfates, azo compounds and hydrazides. Peroxides which are readily commercially available are conveniently used in the present invention, generally in amounts of from about 0.1 to about 10.0 and preferably in amounts of from about 0.3 to about 3.0 parts by weight per each 100 parts of elastomer.

Exemplary of suitable peroxides for the purposes of the present invention are dicumyl peroxide, n-butyl 4,4'-bix (buylperoxy)valerate, 1,1-bis(t-butylperoxy)-3,3,5-trimethyl cyclohexane, di-t-butyl peroxide and 2,5-di-(t-butylperoxy)-2,5 dimethyl hexane and the like, as well as mixtures thereof. It will be understood that the total amount of initiators used will vary depending on the specific end product desired and the particular initiators employed.

Examples of such commercial available peroxides are Luperco 230 or 231 XL, a peroxyketal manufactured and sold by Atochem, Lucidol Division, Buffalo, N.Y., and Trigonox 17/40 or 29/40, a peroxyketal manufactured and sold by Akzo Chemie America, Chicago, Ill. The one hour half life of Luperco 231 XL and Trigonox 29/40 is about 112° C., and the one hour half life of Luperco 230 XL and Trigonox 17/40 is about 129° C. Luperco 230 XL and Trigonox 17/40 are n-butyl-4,4-bis(t-butylperoxy)valerate and Luperco 231 XL and Trigonox 29/40 are 1,1-di(t-butylperoxy) 3,3,5-trimethyl cyclohexane. Trigonox 42-40B from Akzo Nobel of Chicago, Ill. is another preferred peroxide according to the present invention. Most preferably, a solid form of this peroxide is used. Trigonox 42-40B is tert-Butyl peroxy-3,5,5-trimethylhexanoate. The liquid form of this agent is available from Akzo under the designation Trigonox 42S.

The core compositions of the present invention may additionally contain any other suitable and compatible modifying ingredients including, but not limited to, metal oxides, fatty acids, and diisocyanates. For example, Papi 94, a polymeric diisocyanate, commonly available from Dow Chemical Co., Midland, Mich., is an optional component in the rubber compositions. It can range from about 0 to 5 parts by weight per 100 parts by weight rubber (phr) component, and acts as a moisture scavenger.

Various activators may also be included in the compositions of the present invention. For example, zinc oxide and/or magnesium oxide are activators for the polybutadiene. The activator can range from about 2 to about 10 parts by weight per 100 parts by weight of the rubbers (phr) component.

Moreover, filler-reinforcement agents may be added to the composition of the present invention. One such example is polypropylene powder. Since the specific gravity of polypropylene powder is very low, and when compounded, the polypropylene powder produces a lighter molded core, large amounts of higher gravity fillers may be added. Additional benefits may be obtained by the incorporation of relatively large amounts of higher specific gravity, inexpensive mineral fillers such as calcium carbonate. Such fillers as are incorporated into the core compositions should be in finely divided form, as for example, in a size generally less than about 30 mesh and preferably less than about 100 mesh U.S. standard size. The amount of additional filler included in the core composition is primarily dictated by weight restrictions and preferably is included in amounts of from about 10 to about 100 parts by weight per 100 parts rubber.

The preferred fillers are relatively inexpensive and heavy and serve to lower the cost of the ball and to increase the weight of the ball to closely approach the U.S.G.A. weight limit of 1.620 ounces. Exemplary fillers include mineral fillers such as limestone, zinc oxide, silica, mica, barytes, calcium carbonate, or clays. Limestone is ground calcium/magnesium carbonate and is used because it is an inexpensive, heavy filler. Other heavy fillers include metal particles, such as powdered tungsten, bismuth, or molybdenum. Other filler materials are noted herein.

As indicated, ground flash filler may be incorporated and is preferably 20 mesh ground up center stock from the excess flash from compression molding. It lowers the cost and may increase the hardness of the ball.

Fatty acids or metallic salts of fatty acids may also be included in the compositions, functioning to improve moldability and processing. Generally, free fatty acids having from about 10 to about 40 carbon atoms, and preferably having from about 15 to about 20 carbon atoms, are used. Exemplary of suitable fatty acids are stearic acid, palmitic, oleic and linoleic acids, as well as mixtures thereof. Exemplary of suitable metallic salts of fatty acids include zinc stearate. When included in the core compositions, the fatty acid component is present in amounts of from about 1 to about 25, preferably in amounts from about 20 to about 15 parts by weight based on 100 parts rubber (elastomer). It is preferred that the core compositions include stearic acid as the fatty acid adjunct in an amount of from about 2 to about 5 parts by weight per 100 parts of rubber.

Diisocyanates may also be optionally included in the core compositions when utilized, the diisocyanates are included in amounts of from about 0.2 to about 5.0 parts by weight based on 100 parts rubber. Exemplary of suitable diisocyanates is 4,4'-diphenylmethane diisocyanate and other polyfunctional isocyanates known to the art.

Furthermore, the dialkyl tin difatty acids set forth in U.S. Pat. No. 4,844,471, the dispersing agents disclosed in U.S. Pat. No. 4,838,556, and the dithiocarbonates set forth in U.S. Pat. No. 4,852,884 may also be incorporated into the polybutadiene compositions of the present invention. The specific types and amounts of such additives are set forth in the above-identified patents, which are incorporated herein by reference.

The golf ball core compositions of the invention may also comprise from about 1 to about 100 parts by weight of particulate polypropylene resin, and preferably from about 10 to about 100 parts by weight polypropylene powder resin, per 100 parts by weight of a base elastomer (or rubber) selected from polybutadiene and mixtures of polybutadiene with other elastomers. More preferably, the particulate polypropylene resin, if utilized in the core compositions of the present invention, comprises from about 20 to about 40 parts by weight of a polypropylene powder resin such as that trademarked and sold by Amoco Chemical Co. under the designation "6400 P", "7000P" and "7200 P". The ratios of the ingredients may vary and are best optimized empirically.

As indicated above, additional suitable and compatible modifying agents such as fatty acids, and secondary additives such as Pecan shell flour, ground flash (i.e. grindings from previously manufactured cores of substantially identical construction), barium sulfate, zinc oxide, etc. may be added to the core compositions to increase the weight of the ball as necessary in order to have the ball reach or closely approach the U.S.G.A. weight limit of 1.620 ounces.

The method for making the core composition is described in copending application Ser. No. 09/371,994, filed on Aug. 11, 1999, and incorporated herein by reference.

Covers

The cover layers can be formed over the cores by injection molding, compression molding, casting or other conventional molding techniques. Each layer preferably is separately formed. It is preferable to form each layer by either injection molding or compression molding. A more preferred method of making a golf ball of the invention with a multi-layer cover is to successively injection mold each layer in a separate mold. First, the inner cover layer is injection molded over the core in a smooth cavity mold, subsequently any intermediate cover layers are injection molded over the inner cover layer in a smooth cavity mold, and finally the outer cover layer is injection molded over the intermediate cover layers in a dimpled cavity mold.

Ionomeric resins which are useful in the inner cover layer and outer cover layer of the golf balls according to the present invention include copolymers formed from the reaction of an olefin having 2 to 8 carbon atoms and an acid which includes at least one member selected from the group consisting of alpha, beta-ethylenically unsaturated mono- or dicarboxylic acids with a portion of the acid groups being neutralized with cations. Terpolymer ionomers further include an unsaturated monomer of the acrylate ester class having from 1 to 21 carbon atoms. The olefin preferably is an alpha olefin and more preferably is ethylene. The acid preferably is acrylic acid or methacrylic acid. The ionomers typically have a degree of neutralization of the acid groups in the range of about 10–100%.

The outer cover layer of the golf ball of the present invention is preferably a resin material. Non-limiting examples of suitable materials are ionomers, plastomers such as metallocene catalyzed polyolefins, e.g., EXACT, ENGAGE, INSITE or AFFINITY which preferably are cross-linked, polyamides, amide-ester elastomers, graft copolymers of ionomer and polyamide such as CAPRON, ZYTEL, PEBAX, etc., blends containing cross-linked transpolyisoprene, thermoplastic block polyesters such as HYTREL, or thermoplastic or thermosetting polyurethanes, and polyureas such as ESTANE, which is thermoplastic.

Any inner cover layers which are part of the ball can be made of any of the materials listed in the previous paragraph as being useful for forming an outer cover layer, preferably the ionomeric resin materials. Furthermore, any inner cover layers can be formed from a number of other non-ionomeric thermoplastics and thermosets. For example, lower cost polyolefins and thermoplastic elastomers can be used. Non-limiting examples of suitable non-ionomeric polyolefin materials include low density polyethylene, linear low density polyethylene, high density polyethylene, polypropylene, rubber-toughened olefin polymers, acid copolymers which do not become part of an ionomeric copolymer when used in the inner cover layer, such as PRIMACOR, NUCREL, ESCOR and ATX, flexomers, thermoplastic elastomers such as styrene/butadiene/styrene (SBS) or styrene/ethylene-butylene/styrene (SEBS) block copolymers, including Kraton (Shell), dynamically vulcanized elastomers such as Santoprene (Monsanto), ethylene vinyl acetates such as Elvax (DuPont), ethylene methyl acrylates such as Optema (Exxon), polyvinyl chloride resins, and other elastomeric materials may be used. Mixtures, blends, or alloys involving the materials described above can be used. It is desirable that the material used for the inner cover layer be a tough, low density material. The non-ionomeric materials can be mixed with ionomers.

The outer cover layer and any inner cover layers optionally may include processing aids, release agents and/or diluents. Another useful material for any inner cover layer or layers is a natural rubber latex (prevulcanized) which has a tensile strength of 4,000–5,000 psi, high resilience, good scuff resistance, a Shore D hardness of less than 15 and an elongation of 500%.

When the ball has a single cover layer, it has a thickness of 0.010–0.500 inches, preferably 0.015–0.200 inches, and more preferably 0.025–0.150 inches. When the ball has two or more cover layers, the outer cover layer typically has a thickness of 0.01–0.20 inches, preferably 0.02–0.20 inches, and more preferably 0.025–0.15 inches. The one or more inner cover layers have thicknesses appropriate to result in an overall cover thickness of 0.03–0.50 inches, preferably 0.05–0.30 inches and more preferably 0.10–0.20 inches, with the minimum thickness of any single inner cover layer preferably being 0.01 inches.

The core and/or cover layers of the golf ball optionally can include fillers to adjust, for example, flex modulus, density, mold release, and/or melt flow index.

The physical characteristics of the cover are such that the ball has a soft feel. When a single cover layer is used, the Shore D hardness of that cover layer is at least 60 in one preferred form of the invention. When the ball has a multi-layer cover, the Shore D hardness of the outer cover layer is at least 60 in another preferred form of the invention. Preferably, the outer cover layer in a single or multi-layer covered ball has a Shore D hardness of at least 63, more preferably at least 65, and most preferably at least 67. The preferred maximum Shore D hardness for the outer cover layer is 90.

A particularly preferred embodiment of an outer cover layer for use in forming the golf ball of the present invention incorporates high molecular weight ionomer resins, such as EX 1005, 1006, 1007, 1008 and 1009, provided by Exxon Chem. Co., or any combination thereof, as shown in Table 3. These resins are particularly useful in forming the outer cover layer because they have a tensile modulus/hardness ratio that allows for a hard cover over a soft core while maintaining durability.

TABLE 3

Examples of Exxon High Molecular Weight Ionomers

| PROPERTY | Ex 1006 | Ex 1006 | Ex 1007 | Ex 1008 | Ex 1009 | 7310 |
|---|---|---|---|---|---|---|
| Melt Index, g/10 min. | 0.7 | 1.3 | 1.0 | 1.4 | 0.8 | 1.0 |
| Cation | Na | Na | Zn | Zn | Na | Zn |
| Melting Point, °C. | 85.3 | 86 | 85.8 | 86 | 91.3 | 91 |
| Vicat Softening Point, °C. | 54 | 57 | 60.5 | 60 | 56 | 69 |
| Tensile @ Break, MPa | 33.9 | 33.5 | 24.1 | 23.6 | 32.4 | 24 |
| Elongation @ Break, % | 403 | 421 | 472 | 427 | 473 | 520 |
| Hardness, Shore D | 58 | 58 | 51 | 50 | 56 | 52 |
| Flexural Modulus, MPa | 289 | 290 | 152 | 141 | 282 | 150 |

Appropriate fillers or additive materials may also be added to produce the cover compositions of the present invention. These additive materials include dyes (for example, Ultramarine Blue sold by Whitaker, Clark and Daniels of South Plainfield, N.J.), and pigments, i.e., white pigments such as titanium dioxide (for example UNITANE 0-110 commercially available from Kemira, Savannah, Ga.) zinc oxide, and zinc sulfate, as well as fluorescent pigments. As indicated in U.S. Pat. No. 4,884,814, the amount of pigment and/or dye used in conjunction with the polymeric cover composition depends on the particular base ionomer mixture utilized and the particular pigment and/or dye utilized. The concentration of the pigment in the polymeric cover composition can be from about 1% to about 10% as based on the weight of the base ionomer mixture. A more preferred range is from about 1% to about 5% as based on the weight of the base ionomer mixture. The most preferred range is from about 1% to about 3% as based on weight of the base ionomer mixture. The most preferred pigment for use in accordance with this invention is titanium dioxide (Anatase).

Moreover, since there are various hues of white, i.e. blue white, yellow white, etc., trace amounts of blue pigment may be added to the cover stock composition to impart a blue white appearance thereto. However, if different hues of the color white are desired, different pigments can be added to the cover composition at the amounts necessary to produce the color desired.

In addition, it is within the purview of this invention to add to the cover compositions of this invention compatible materials which do not affect the basic novel characteristics of the composition of this invention. Among such materials are antioxidants (i.e. Santonox R), commercially available from Flexysys, Akron, Ohio, antistatic agents, stabilizers, compatablizers and processing aids. The cover compositions of the present invention may also contain softening agents, such as plasticizers, etc., and reinforcing materials, as long as the desired properties produced by the golf ball covers of the invention are not impaired.

Furthermore, optical brighteners, such as those disclosed in U.S. Pat. No. 4,679,795 may also be included in the cover composition of the invention. Examples of suitable optical brighteners which can be used in accordance with this invention are Uvitex OB as sold by the Ciba-Geigy Chemical Company, Ardsley, N.Y. Uvitex OB is believed to be 2,5-Bis(5-tert-butyl-2-benzoxazoyl)-thiophene. Examples of other optical brighteners suitable for use in accordance with this invention are as follows: Leucopure EGM as sold by Sandoz, East Hanover, N.J. 07936. Leucopure EGM is thought to be 7-(2n-naphthol(1,2-d)-triazol-2yl(3phenyl-coumarin. Phorwhite K-20G2 is sold by Mobay Chemical Corporation, P.O. Box 385, Union Metro Park, Union, N.J. 07083, and is thought to be a pyrazoline derivative. Eastobrite OB-1 as sold by Eastman Chemical Products, Inc., Kingsport, Tenn. is thought to be 4,4-Bis(-benzoxaczoyl) stilbene. The above-mentioned UVITEX and EASTOBRITE OB-1 are preferred optical brighteners for use in accordance with this invention.

Moreover, since many optical brighteners are colored, the percentage of optical brighteners utilized must not be excessive in order to prevent the optical brightener from functioning as a pigment or dye in its own right.

The percentage of optical brighteners which can be used in accordance with this invention is from about 0.01% to about 0.5% as based on the weight of the polymer used as a cover stock. A more preferred range is from about 0.05% to about 0.25% with the most preferred range from about 0.10% to about 0.20% depending on the optical properties of the particular optical brightener used and the polymeric environment in which it is a part.

Generally, the additives are admixed with an ionomer to be used in the cover composition to provide a masterbatch (abbreviated herein as MB) of desired concentration and an amount of the masterbatch sufficient to provide the desired amounts of additive is then admixed with the copolymer blends.

The cover composition preferably contains high quantities of ionomer. Thus, the irradiated cover material has a combination of ionic crosslinks and covalent crosslinks. Particularly preferred ionomers or ionomer blends include ionic copolymers containing an olefin, an unsaturated carboxylic acid, and an acrylate. Such polymers typically, although not necessarily, have a Shore D hardness in the range of 20–60. Non-ionomeric materials can be blended with the ionomer as long as an acceptable increase in scuff resistance and/or cut resistance is obtained as a result of covalent crosslinking of the ionomer. Non-limiting examples of materials to be blended with an ionomer include ethylene-ethyl acrylate, ethylene-methyl acrylate, ethylene-vinyl acetate, low density polyethylene, linear low density polyethylene, metallocene catalyzed polyolefins such as ENGAGE polyolefins available from Dow Chemical and EXACT polyolefins available from Exxon, non-ionomeric acid copolymers such as PRIMACOR, available from Dow Chemical, and NUCREL, available from DuPont, and a variety of thermoplastic elastomers, including KRATON, available from Shell, SANTOPRENE, available from Monsanto, and HYTREL, available from DuPont, etc.

If the game ball cover is irradiated prior to application of a primer coat and/or top coat 16, there is no particular restriction on the type of primer coat and/or top coat to be used. If irradiation occurs after application of a primer coat and/or a top coat over the cover 14, it is important to ensure that the radiation will penetrate the coating and that the dosage of radiation is sufficient to covalently crosslink the cover material without adversely affecting the properties of the primer and/or top coat to a substantial degree. Due to the thinness of the primer coat and top coat on most game balls, including golf balls, it has been found that little change in radiation dosage is required if irradiation occurs after application of such coatings.

Definitions

The following is a series of definitions used in the specification and claims.

PGA Compression

PGA compression is an important property involved in the performance of a golf ball. The compression of the ball can affect the playability of the ball on striking and the sound or "click" produced. Similarly, compression can effect the "feel" of the ball (i.e., hard or soft responsive feel), particularly in chipping and putting.

Moreover, while compression itself has little bearing on the distance performance of a ball, compression can affect the playability of the ball on striking. The degree of compression of a ball against the club face and the softness of the cover strongly influences the resultant spin rate. Typically, a softer cover will produce a higher spin rate than a harder cover. Additionally, a harder core will produce a higher spin rate than a softer core. This is because at impact a hard core serves to compress the cover of the ball against the face of the club to a much greater degree than a soft core thereby resulting in more "grab" of the ball on the clubface and subsequent higher spin rates. In effect the cover is squeezed between the relatively incompressible core and clubhead. When a softer core is used, the cover is under much less compressive stress than when a harder core is used and therefore does not contact the clubface as intimately. This results in lower spin rates.

The term "compression" utilized in the golf ball trade generally defines the overall deflection that a golf ball undergoes when subjected to a compressive load. For example, PGA compression indicates the amount of change in golf ball's shape upon striking. The development of solid core technology in two-piece balls has allowed for much more precise control of compression in comparison to thread wound three-piece balls. This is because in the manufacture of solid core balls, the amount of deflection or deformation is precisely controlled by the chemical formula used in making the cores. This differs from wound three-piece balls wherein compression is controlled in part by the winding process of the elastic thread. Thus, two-piece and multi-layer solid core balls exhibit much more consistent compression readings than balls having wound cores such as the thread wound three-piece balls.

In the past, PGA compression related to a scale of from 0 to 200 given to a golf ball. The lower the PGA compression value, the softer the feel of the ball upon striking. In practice, tournament quality balls have compression ratings around 70–110, preferably around 80 to 100.

In determining PGA compression using the 0–200 scale, a standard force is applied to the external surface of the ball. A ball which exhibits no deflection (0.0 inches in deflection) is rated 200 and a ball which deflects 2/10th of an inch (0.2 inches) is rated 0. Every change of 0.001 of an inch in deflection represents a 1 point drop in compression. Consequently, a ball which deflects 0.1 inches (100×0.001 inches) has a PGA compression value of 100 (i.e., 200–100) and a ball which deflects 0.110 inches (110×0.001 inches) has a PGA compression of 90 (i.e., 200–110).

In order to assist in the determination of compression, several devices have been employed by the industry. For example, PGA compression is determined by an apparatus fashioned in the form of a small press with an upper and lower anvil. The upper anvil is at rest against a 200-pound die spring, and the lower anvil is movable through 0.300 inches by means of a crank mechanism. In its open position the gap between the anvils is 1.780 inches allowing a clearance of 0.100 inches for insertion of the ball. As the lower anvil is raised by the crank, it compresses the ball against the upper anvil, such compression occurring during the last 0.200 inches of stroke of the lower anvil, the ball then loading the upper anvil which in turn loads the spring. The equilibrium point of the upper anvil is measured by a dial micrometer if the anvil is deflected by the ball more than 0.100 inches (less deflection is simply regarded as zero compression) and the reading on the micrometer dial is referred to as the compression of the ball. In practice, tournament quality balls have compression ratings around 80 to 100 which means that the upper anvil was deflected a total of 0.120 to 0.100 inches.

An example to determine PGA compression can be shown by utilizing a golf ball compression tester produced by Atti Engineering Corporation of Newark, N.J. The value obtained by this tester relates to an arbitrary value expressed by a number which may range from 0 to 100, although a value of 200 can be measured as indicated by two revolutions of the dial indicator on the apparatus. The value obtained defines the deflection that a golf ball undergoes when subjected to compressive loading. The Atti test apparatus consists of a lower movable plafform and an upper movable spring-loaded anvil. The dial indicator is mounted such that it measures the upward movement of the spring-loaded anvil. The golf ball to be tested is placed in the lower platform, which is then raised a fixed distance. The upper portion of the golf ball comes in contact with and exerts a pressure on the springloaded anvil. Depending upon the distance of the golf ball to be compressed, the upper anvil is forced upward against the spring.

Alternative devices have also been employed to determine compression. For example, Applicant also utilizes a modified Riehle Compression Machine originally produced by Riehle Bros. Testing Machine Company, Phil., Pa. to evaluate compression of the various components (i.e., cores, mantle cover balls, finished balls, etc.) of the golf balls. The Riehle compression device determines deformation in thousandths of an inch under a load designed to emulate the 200 pound spring constant of the Atti or PGA compression device. Using such a device, a Riehle compression of 61 corresponds to a deflection under load of 0.061 inches.

Additionally, an approximate relationship between Riehle compression and PGA compression exists for balls of the same size. It has been determined by Applicant that Riehle compression corresponds to PGA compression by the general formula PGA compression=160−Riehle compression. Consequently, 80 Riehle compression corresponds to 80 PGA compression, 70 Riehle compression corresponds to 90 PGA compression, and 60 Riehle compression corresponds to 100 PGA compression. For reporting purposes, Applicant's compression values are usually measured as Riehle compression and converted to PGA compression.

Furthermore, additional compression devices may also be utilized to monitor golf ball compression so long as the correlation to PGA compression is know. These devices have been designed, such as a Whitney Tester, to correlate or correspond to PGA compression through a set relationship or formula.

Coefficient of Restitution

The resilience or coefficient of restitution (COR) of a golf ball is the constant "e," which is the ratio of the relative velocity of an elastic sphere after direct impact to that before impact. As a result, the COR ("e") can vary from 0 to 1, with 1 being equivalent to a perfectly or completely elastic collision and 0 being equivalent to a perfectly or completely inelastic collision.

COR, along with additional factors such as club head speed, club head mass, ball weight, ball size and density, spin rate, angle of trajectory and surface configuration (i.e., dimple pattern and area of dimple coverage) as well as environmental conditions (e.g. temperature, moisture, atmospheric pressure, wind, etc.) generally determine the distance a ball will travel when hit. Along this line, the distance a golf ball will travel under controlled environmental conditions is a function of the speed and mass of the club and size, density and resilience (COR) of the ball and other factors. The initial velocity of the club, the mass of the club and the angle of the ball's departure are essentially provided by the golfer upon striking. Since club head, club head mass, the angle of trajectory and environmental conditions are not determinants controllable by golf ball producers and the ball size and weight are set by the U.S.G.A., these are not factors of concern among golf ball manufacturers. The factors or determinants of interest with respect to improved distance are generally the coefficient of restitution (COR) and the surface configuration (dimple pattern, ratio of land area to dimple area, etc.) of the ball.

The COR in solid core balls is a function of the composition of the molded core and of the cover. The molded core and/or cover may be comprised of one or more layers such as in multi-layered balls. In balls containing a wound core (i.e., balls comprising a liquid or solid center, elastic windings, and a cover), the coefficient of restitution is a function of not only the composition of the center and cover, but also the composition and tension of the elastomeric windings. As in the solid core balls, the center and cover of a wound core ball may also consist of one or more layers.

The coefficient of restitution is the ratio of the outgoing velocity to the incoming velocity. In the examples of this application, the coefficient of restitution of a golf ball was measured by propelling a ball horizontally at a speed of 125+/−5 feet per second (fps) and corrected to 125 fps against a generally vertical, hard, flat steel plate and measuring the ball's incoming and outgoing velocity electronically. Speeds were measured with a pair of Oehler Mark 55 ballistic screens available from Oehler Research, Inc., P.O. Box 9135, Austin, Tex. 78766, which provide a timing pulse when an object passes through them. The screens were separated by 36" and are located 25.25" and 61.25" from the rebound wall. The ball speed was measured by timing the pulses from screen 1 to screen 2 on the way into the rebound wall (as the average speed of the ball over 36"), and then the exit speed was timed from screen 2 to screen 1 over the same distance. The rebound wall was tilted 2 degrees from a vertical plane to allow the ball to rebound slightly downward in order to miss the edge of the cannon that fired it. The rebound wall is solid steel 2.0 inches thick.

As indicated above, the incoming speed should be 125±5 fps but corrected to 125 fps. The correlation between COR and forward or incoming speed has been studied and a correction has been made over the is fps range so that the COR is reported as if the ball had an incoming speed of exactly 125.0 fps.

The coefficient of restitution must be carefully controlled in all commercial golf balls if the ball is to be within the specifications regulated by the United States Golf Association (U.S.G.A.). As mentioned to some degree above, the U.S.G.A. standards indicate that a "regulation" ball cannot have an initial velocity exceeding 255 feet per second in an atmosphere of 75° F. when tested on a U.S.G.A. machine. Since the coefficient of restitution of a ball is related to the ball's initial velocity, it is highly desirable to produce a ball having sufficiently high coefficient of restitution to closely approach the U.S.G.A. limit on initial velocity, while having an ample degree of softness (i.e., hardness) to produce enhanced playability (i.e., spin, etc.).

Shore D Hardness

As used herein, "Shore D hardness" of a cover layer is measured generally in accordance with ASTM D-2240, except the measurements are made on the curved surface of a molded cover layer, rather than on a plaque. Furthermore, the Shore D hardness of the cover layer is measured while the cover layer remains over the core and any underlying cover layers. When a hardness measurement is made on a dimpled cover, Shore D hardness is measured, to the best extent possible, at a land area of the dimpled cover.

Golf balls according to the invention preferably have a post-irradiation PGA compression of 10–110. In a particularly preferred form of the invention, the golf balls have a PGA compression of about 40–100 after irradiation. It has been found that excellent results are obtained when the post-irradiation PGA compression of the golf balls is an increase in PGA compression of at least 5% as compared to the PGA compression of the ball prior to treatment. The coefficient of restitution of the golf balls of the invention after treatment is in the range of 0.780 or greater. Preferably, the COR of the golf balls is in the range of 0.790–0.830 and most preferably 0.800–0.830. The Shore D hardness of the golf balls of the invention after irradiation is in the range of 40–80. Particularly good results are obtained when the Shore D hardness of the golf balls is in the range of 50–70, and most preferably 50–60.

The invention is particularly well suited for use in making dimpled, pebbled, and other game balls which do not have a smooth outer surface, including game balls with simulated stitching. A smooth ball is less susceptible to scuffing than a dimpled ball since dimples give the golf club groove a sharp-edged surface to "catch." Pebbles clearly are susceptible to shearing when dribbled on a hard surface, or the like. Likewise on a molded-cover softball, the stitching is a raised area that will be sheared or compressed more than the smooth-surfaced area by a bat and/or by the turf, dirt, etc.

Figure 2:
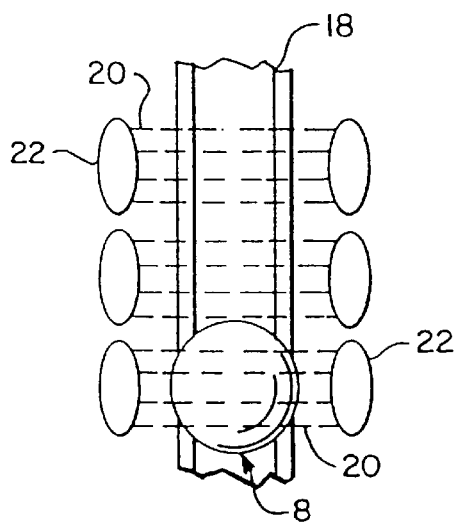
FIGS. 2–3 schematically show one embodiment for practicing the method of the invention.
Figure 3:
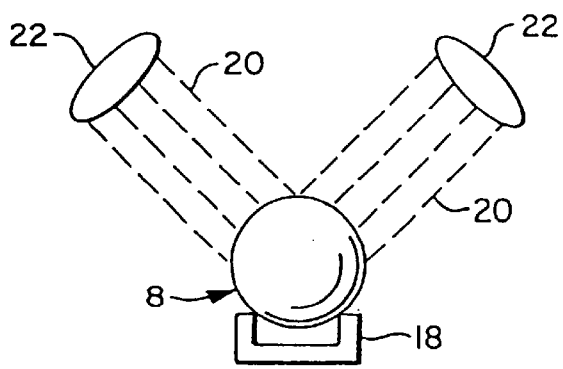

One embodiment of a method for electron beam treating golf balls according to the invention can be described in connection with FIGS. 2 and 3. The golf ball 8 is placed on a channel 18 along which it slowly moves. Electrons 20 from electron beam lamps 22 contact the surface of the ball 8. The lamps are positioned to provide a generally uniform dose of radiation on the entire surface of the ball as the ball rolls along the channel 18. Preferably, the balls are irradiated with an electron beam dosage of 1 or more megarads, more preferably 2–12 megarads. The intensity of the dosage preferably is in the range of 1–20 MeV.

The golf balls of the invention are found to exhibit a post-treatment scuff resistance in the range of 1–3 on a scale of 1–4. It is preferred that the treatment be appropriate to provide the golf balls with a scuff resistance of 1–2.5, and more preferably 1–2. Golf balls according to the invention have a cut resistance in the range of 1–3 on a scale of 1–5. It is preferred that the golf balls of the invention have a cut resistance of 1–2.5 and most preferably 1–2.

The scuff resistance test was conducted in the following manner: a Top-Flite Tour pitching wedge (1994) with box grooves was obtained and was mounted in a Miyamae driving machine. The club face was oriented for a square hit. The forward/backward tee position was adjusted so that the tee was four inches behind the point in the downswing where the club was vertical. The height of the tee and the toe-heel position of the club relative to the tee were adjusted in order that the center of the impact mark was about ¾ of an inch above the sole and was centered toe to heel across the face. The machine was operated at a clubhead speed of 125 feet per second. Three samples of each ball were tested. Each ball was hit three times. After testing, the balls were rated according to the following table:

| Rating | Type of Damage |
| --- | --- |
| 1 | Little or no damage (groove markings or dents) |
| 2 | Small cuts and/or ripples in cover |
| 3 | Moderate amount of material lifted from ball surface but still attached to ball |
| 4 | Material removed or barely attached |

Cut resistance was measured in accordance with the following procedure: A golf ball was fired at 135 feet per second against the leading edge of a 1994 Top-Flite Tour pitching wedge, wherein the leading edge radius is 1/32 inch, the loft angle is 51 degrees, the sole radius is 2.5 inches, and the bounce angle is 7 degrees.

The cut resistance of the balls tested herein was evaluated on a scale of 1–5. A 5 represents a cut that extends completely through the cover to the core; a 4 represents a cut that does not extend completely through the cover but that does break the surface; a 3 does not break the surface of the cover but does leave a permanent dent; a 2 leaves only a slight crease which is permanent but not as severe as 3; and a 1 represents virtually no visible indentation or damage of any sort.

It has been found that golf balls which are treated according to the irradiation technique of the present invention exhibit a particular improvement in scuff and/or cut resistance. This improvement is particularly significant when the golf balls are struck with a square-grooved iron. It is has been found that square-grooved irons and other sharp-grooved irons tend to abrade and damage golf ball covers more readily than irons having "V-type" grooves.

Having generally described the invention, the following examples are included for purposes of illustration so that the invention may be more readily understood and are in no way intended to limit the scope of the invention unless otherwise specifically indicated.

EXAMPLE 1

Polybutadiene golf ball cores having an average coefficient of restitution (COR) of 0.790 and a PGA compression of 90 were obtained. The cores were covered with a relatively soft, 0.055 inch thick cover formed from an ionomeric composition, designated as ionomer 1, which includes a blend of a hard sodium ionomer and a soft zinc ionomer. Pigments and an optical brightener were also included in the cover composition. The hard ionomer is a copolymer containing two monomer types, namely an a-olefin and an acrylic-type carboxylic acid. The soft ionomer is a copolymer which contains three types of monomers, namely an α-olefin, an acrylic-type carboxylic acid, and an acrylate. The cover was formed over the core. The balls were primed with a polyurethane-based primer with a thickness of about 0.5 thousandths of an inch and coated with a polyurethane top coat with a thickness of about 0.5 thousandths of an inch. The properties of these balls prior to electron beam treatment are shown on Table 4.

A portion of the balls were subjected to electron beam treatment at dosages of 2, 4, 6, 8 and 11 megarads at an energy level of 10 MeV. Changes in the properties of the balls are shown on Table 4.

As indicated on Table 4, the scuff resistance of the golf balls substantially improved between electron beam dosages of 2 and 6 megarads. The cut resistance of the balls improved between electron beam dosages of 6 and 8 megarads. Meanwhile, the change in Shore D hardness in the dosage range of 2 to 8 was only 1.

EXAMPLE 2

Golf ball cores having an average PGA compression of 85 and an average COR of 0.800 were obtained. The cores were covered with a hard zinc-sodium ionomeric cover composition containing two monomer types, namely an α-olefin and a carboxylic acid. The initial properties of the covered cores prior to priming and finish coating are shown on Table 4.

A portion of the golf balls were primed with the same polyurethane-based primer as was used in Example 1 and then coated with the same polyurethane top coat as was used in Example 4. Subsequently, a portion of both the unprimed and unfinished golf balls and the primed and finished golf balls were subjected to electron beam treatment in the dosages shown on Table 4. Properties of compression, COR, Shore D hardness and scuff resistance are shown on Table 4.

As indicated in Table 4, the scuff resistance of the finished golf balls increased substantially while resulting in a minimal increase in Shore D hardness.

TABLE 4

| Cover Material | Dosage (Megarads) | Weight | PGA Comp. | COR | Shore D | Scuff Resistance | Cut Resistance |
|---|---|---|---|---|---|---|---|
| Ionomer Blend 1 (coated prior to treatment) | 2.0 | 45.5 | 93 | .788 | 54 | 2.5 | 2–3 |
|  | 4.0 | 45.5 | 97 | .797 | 55 | 1.2 | 2–3 |
|  | 6.0 | 45.5 | 98 | .795 | 55 | 1.5 | 2–3 |
|  | 8.0 | 45.5 | 98 | .797 | 55 | 1.5 | 2 |
|  | 11.0 | 45.5 | 101 | .802 | 55 | 1.5 | 2 |
|  | 0 | 45.5 | 92 | .787 | 54 | 3.5 | 3 |
| Ionomer Blend 2 (uncoated) | 2.0 | 45.4 | 96 | .822 | 63 | — | — |
|  | 4.0 | 45.4 | 97 | .822 | 63 | — | — |
|  | 0 | 45.4 | 88 | .812 | 62 | — | — |
| Ionomer Blend 2 (coated with primer and top coat prior to treatment) | 6.0 | 45.5 | 101 | .829 | 64 | 1.5 | 1–2 |
|  | 8.0 | 45.5 | 103 | .828 | 64 | 1.5 | 1–2 |
|  | 0 | 45.5 | 88 | .813 | 63 | 2.0 | 1–2 |

An additional embodiment according to the present invention utilizes blends of the Neo Cis polymers in the core compositions. The following Table represents core formulations which utilizes a blend of Neo Cis 40 and Neo Cis 60 with Cariflex BCP-820 (amounts of ingredients are in parts per hundred rubber (phr) based on 100 parts butadiene rubber):

TABLE 5

| | Formulation No. | |
|---|---|---|
| Ingredient | 1 | 2 |
| Cariflex BCP-820 | 40 | 40 |
| Neo Cis 60 | 30 | 30 |
| Neo Cis 40 | 30 | 30 |
| Zinc Oxide | 31.4 | 30.9 |
| Zinc Stearate | 16 | 16 |
| ZDA | 18.2 | 19.2 |
| Yellow MB | 0.14 | — |
| Green MB | 0.05 | — |
| Black MB | — | 0.2 |
| Red MB | — | — |
| Blue MB | — | — |
| Triganox 42-40B | 1.25 | 1.25 |

The core formulations set forth above in Table 5 were then utilized to produce the following corresponding cores:

TABLE 6

| Property | Core Sample 1 | Core Sample 2 |
|---|---|---|
| Size (pole dia. inches) | 1.47" ± 0.004 | 1.47" ± 0.004 |
| Weight (grams) | 33.3 g ± 0.3 | 33.3 g ± 0.3 |
| Riehle Comp. | 135 ± 10 | 125 ± 10 |
| C.O.R. | 0.775 ± 0.015 | 0.765 ± 0.015 |
| Specific Gravity | 1.194 ± 0.05 | 1.194 ± 0.05 |
| JIS C | 69 ± 2 | 71 ± 2 |
| Shore C | 69 ± 2 | 71 ± 2 |
| Shore D | 40 ± 2 | 42 ± 2 |

In a preferred embodiment, the cores utilizing the blend of Neo Cis 40 and Neo Cis 60 have a mantle or inner cover layer formed thereon. A variety of ionomers may be utilized in the mantle or inner cover layer of the multi-layer golf balls according to the present invention. Ionomeric resins such as those designated as Surlyn®, manufactured by DuPont, and Iotek, manufactured by Exxon, are suitable for forming the mantle layer, but any polymer conventionally used to form inner cover layers in the multi-layer golf balls can be used. The following Table 7 includes ionomers which are exemplary of specific ionomers which may be utilized in the inner cover layer of multi-layer balls according to the present invention. These examples are not intended to be limiting of the specific ionomers which can be used.

TABLE 7

| | Individual Ionomers | | |
|---|---|---|---|
| | Iotek 1002 | Iotek 1003 | Surlyn ® 8552 |
| % Acid Type | 18% AA | 18% AA | 19% MA |
| Ionomer Type | Copolymer | Copolymer | Copolymer |
| Cation | Na | Zn | Mg |
| Melt Index | 2 | 1 | 1.3 |
| Stiffness Modulus *2 | 4053 MPa | 1873 MPa | 3499 Kfg/cm² |

AA = Acrylic Acid; MA = Methacrylic Acid
*2 Stiffness measurements done using Toyoseiki Stiffness Tester The mantle layer may also contain other additives such as heavy weight fillers including bronze, brass, tungsten, and the like.

The following represents various intermediate golf balls formed from the cores of Table 6.

TABLE 8

| | Intermediate Ball with Inner Cover | |
|---|---|---|
| | 1 | 2 |
| Core Formulation (From Table 6) | 1 | 2 |
| Mantle Composition (Wt %) | | |
| Iotek 1002 (Na) | 50% | 50% |
| Iotek 1003 (Zn) | 50% | 50% |
| Surlyn 8552 (Ma) | — | — |
| Filler (Bronze Powder) | — | — |
| TiO₂ | — | — |

The inner cover layers, or mantles, as set forth in Table 8 above have the following characteristics as shown in Table 9 below:

TABLE 9

| | Intermediate Ball (from Table 8) | |
|---|---|---|
| Property | 1 | 2 |
| Flex Modulus (weighted avg.) | 264 MPa | 264 MPa |
| Stiffness Modulus | 3521 Kgf/cm² | 3521 Kgf/cm² |
| Size (intermediate ball) | 1.570" ± 0.004 | 1.570" ± 0.004 |
| Weight (intermediate ball) | 38.3 g ± 0.3 | 38.3 g ± 0.3 |
| Thickness | 0.050" ± 0.008 | 0.050" ± 0.008 |
| Riehle Comp | 122 ± 12 | 112 ± 12 |
| C.O.R. | 0.780 ± 0.015 | 0.790 ± 0.015 |
| Mantle Specific Gravity | 0.96 ± 0.01 | 0.96 ± 0.01 |
| JIS C | 97 ± 1 | 97 ± 1 |
| Shore C | 97 ± 1 | 97 ± 1 |
| Shore D | 70 ± 1 | 70 ± 1 |

The intermediate balls, as shown in Table 8 were then formed into finished golf balls by covering them with an outer cover formulation. The covers are typically ionomeric but other polymers may be utilized in the covers as set forth herein before. Ionomers typically associated with the golf balls according to the present invention include those designated as Surlyn®, manufactured by DuPont, and Iotek, manufactured by Exxon. The ionomers may be used individually or in blends. The following Table 10 includes ionomers which are exemplary of specific ionomers that may be utilized for the outer cover layer of golf balls according to the present invention.

TABLE 10

| | Outer Cover Ionomers | | | | | | | | |
|---|---|---|---|---|---|---|---|---|---|
| | Surlyn 8940 | Surlyn 9910 | Surlyn 8320 | Surlyn 8120 | Surlyn 8549 | Iotek 7030 | Iotek 7510 | Iotek 7520 | Iotek 8000 |
| % Acid Type | 15% MA | 15% MA | -7% MA | -7% MA | 15% MA | 15% AA | 6% AA | 6% AA | 15% AA |
| Ionomer Type | Copolymer | Copolymer | Terpolymer | Terpolymer | Copolymer | Copolymer | Terpolymer | Terpolymer | Copolymer |
| Cation | Na | Zn | Na | Na | Na | Zn | Zn | Zn | Na |
| Melt Index | 2.8 | 0.7 | 0.8 | 2 | 2.3 | 2.5 | 0.8 | 2 | 2 |
| Stiffness Modulus *2 | 2705 Kgf/cm² | 2874 Kgf/cm² | 168 Kgf/cm² | 492 Kgf/cm² | — | 1840 Kgf/cm² | 284 Kgf/cm² | 270 MPa | 3323 Kgf/cm² |

AA = Acrylic Acid;
MA = Methacrylic Acid
*2 Stiffness measurements done using Toyoseiki Stiffness Tester The intermediate golf balls of Table 8 were then covered with cover formulations to produce the following finished golf balls:

TABLE 11

| Finished Ball | A | B |
|---|---|---|
| Intermediate Ball (from Table 8) | 1 | 2 |
| Cover Composition (Wt %) | | |
| Surlyn 8549 (Na) | 7.3% | 7.3% |
| Iotek 7510 (Zn) | 42% | 42% |
| Iotek 7520 (Zn) | 50.7% | 50.7% |
| Surlyn 8940 (Na) | — | — |
| Surlyn 9910 (Zn) | — | — |
| Surlyn 8320 (Na) | — | — |
| Surlyn 8120 (Na) | — | — |
| Iotek 7030 (Zn) | — | — |
| Iotek 8000 (Na) | — | — |
| Whitener (TiO$_2$)* | 2.3 phr | 2.3 phr |

*Amount based on parts per hundred resin

The finished balls of Table 11 above had the following characteristics:

TABLE 12

| | Finished Ball (from Table 11) | |
|---|---|---|
| Property | A | B |
| Flex Modulus (weighted avg.) | 58 MPa | 58 MPa |
| Stiffness Modulus (estimate) | ~ 300 Kgf/cm$^2$ | ~ 300 Kgf/cm$^2$ |
| Combined Mantle/Cover Stiffness | ~ 700 Kgf/cm$^2$ | ~ 700 Kgf/cm$^2$ |
| Cover Specific Gravity | 0.98 ± 0.01 | 0.98 ± 0.01 |
| Size | 1.685" ± 0.005 | 1.685" ± 0.005 |
| Weight | 45.4 g ± 0.4 | 45.4 g ± 0.4 |
| Riehle Compression | 105 ± 10 | 100 ± 10 |
| C.O.R. | 0.770 ± 0.015 | 0.780 ± 0.015 |
| JIS C | 72 ± 1 | 72 ± 1 |
| Shore C | 72 ± 1 | 72 ± 1 |
| Shore D | 46 ± 1 | 46 ± 1 |

An additional step of exposure to gamma radiation was performed on balls A and B of Table 12 producing golf balls having the following characteristics:

TABLE 13

| | Finished Balls (Post Gamma) | | | |
|---|---|---|---|---|
| Finished Ball (From Table 11) | A (Ball) | A (Core) | B (Ball) | B (Core) |
| Property (Post Gamma) | | | | |
| Gamma Dosage (Ball) | 35–70 Kgys | — | 35–70 Kgys | — |
| Size | 1.683" ± 0.003 | 1.47" ± 0.004 | 1.683" ± 0.003 | 1.47 ± 0.004 |
| Thickness (Cover) | 0.057" ± 0.008 | — | 0.057" ± 0.008 | — |
| Weight | 45.5 g ± 0.4 | 33.3 g ± 0.3 | 45.5 g ± 0.4 | 33.3 g ± 0.3 |
| Riehle Compression | 86 ± 5 | 120 ± 10 | 81 ± 5 | 110 ± 10 |
| C.O.R. | 0.795 ± 0.015 | 0.770 ± 0.020 | 0.800 ± 0.015 | 0.780 ± 0.020 |
| Cover Specific Gravity | 0.98 ± 0.01 | — | 0.98 ± 0.1 | — |
| Core Specific Gravity | — | 1.194 ± 0.05 | — | 1.194 ± 0.05 |
| JIS C | 72 ± 1 | 78 ± 2 | 72 ± 1 | 80 ± 2 |
| Shore C | 72 ± 1 | 78 ± 2 | 72 ± 1 | 80 ± 2 |
| Shore D | 46 ± 1 | 48 ± 2 | 46 ± 1 | 50 ± 2 |
| Dimple Pattern | 422 Tri | — | 422 Tri | — |

The method of gamma radiation treatment of golf balls, including benefits and property changes attained therefrom, is also taught in commonly assigned U.S. Pat. No. 5,857,925 to Sullivan et al., which is incorporated herein by reference. Benefits and/or property changes associated with gamma radiation treatment of golf balls include, but are not limited to, increased melting temperature for the ionomer cover, increased compression and C.O.R. for the core, allows softer starting materials for core, etc.

The invention has been described with reference to the preferred embodiments. Obviously, modifications and alterations will occur to others upon reading and understanding the preceding detailed description. It is intended that the invention be construed as including all such alternations and modifications insofar as they come within the scope of the claims and the equivalents thereof.

What is claimed is:

1. A golf ball comprising:
   a core including (i) a first polybutadiene rubber obtained utilizing a cobalt catalyst and having a Mooney viscosity in the range of from about 70 to about 83, and (ii) a blend of polybutadiene rubbers wherein each is obtained by utilizing a neodymium series catalyst and having a Mooney viscosity of from about 30 to about 70; and
   an ionomeric cover disposed about said core wherein said cover comprises an inner cover layer and an outer cover layer, further wherein the outer cover layer has a sufficient degree of crosslinking to impart to the cover an improved resistance to at least one of scuffing, cutting and heat.

2. A golf ball according to claim 1, wherein the outer cover layer is a blend of ionomeric resins.

3. A golf ball according to claim 1, wherein the outer cover layer has a dimpled surface.

4. A golf ball according to claim 1, wherein the covalent crosslinking comprises radiation-induced covalent crosslinking.

5. A golf ball according to claim 1, wherein the degree of covalent crosslinking is appropriate to impart to the cover a Shore D hardness which is no more than about 10% greater than the Shore D hardness of a cover having a substantially identical composition but which does not include a substantial degree of covalent crosslinking.

6. A golf ball according to claim 1, wherein the inner cover layer is ionomeric.

7. A golf ball according to claim 1, wherein the outer cover has a Shore D hardness of about 65 or less.

8. A golf ball according to claim 4, wherein the degree of covalent crosslinking is sufficient to impart to the ball a coefficient of restitution which is at least 0.50% greater than a coefficient of restitution of a ball with a cover having a substantially identical composition but which does not have radiation-induced covalent crosslinking.

9. A golf ball according to claim 2, wherein the degree of covalent crosslinking is sufficient to Impart to the ball a PGA compression which is at least 5% harder than the PGA compression of a golf ball with a cover having a substantially identical composition but which does not have a substantial degree of covalent crosslinking.

10. The golf ball of claim 1 wherein said first polybutadiene rubber includes at least 90% cis-1,4 polybutadiene.

11. The golf ball of claim 1 wherein said blend of polybutadiene rubbers comprises a first polybutadiene having a Mooney viscosity of about 40 and a second polybutadiene having a Mooney viscosity of about 60.

12. The golf ball of claim 1 wherein said first polybutadiene rubber is present in an amount of about 40% by weight of the rubber composition of the core.

13. The golf ball of claim 1 wherein said blend of polybutadiene rubbers is present in an amount of about 60% by weight of the rubber composition of the core.

14. The golf ball of claim 13 wherein said blend of polybutadiene rubbers is comprised of about 30% by weight of a first polybutadiene having a Mooney viscosity of about 40 and about 30% by weight of a second polybutadiene having a Mooney viscosity of about 60.

15. A method of forming a golf ball according to claim 1, comprising:

obtaining a golf ball in accordance with claim 1, and irradiating the ionomer in the cover under conditions appropriate to covalently crosslink the ionomer in order to increase the resistance of the cover to at least one of scuffing and cutting without substantially impairing other playability characteristics of the ball.

16. A method according to claim 15, wherein the golf ball has a dimpled surface.

17. A method according to claim 15, wherein the cover is irradiated using an electron beam.

18. A method according to claim 15, wherein the cover is subjected to electron beam treatment at a dosage of at least 2 megarads.

19. A method according to claim 15, wherein the golf ball cover is irradiated after application of a coating over the cover.

20. A method according to claim 15, further comprising the step of applying a top coating over the cover after irradiation.

21. The method according to claim 15, wherein the cover is irradiated with a member selected from the group consisting of electron radiation, neutron radiation, proton radiation, gamma radiation, x-rays, helium nuclei, and combinations thereof.

22. The method according to claim 15, wherein the cover is irradiated with gamma radiation.

23. The method according to claim 22, wherein the cover is irradiated with gamma radiation to a dosage of 2 to 12 megarads.

24. The method according to claim 23 wherein the dosage is 4 to 8 megarads.

* * * * *